Dec. 22, 1953   D. W. FENTRESS   2,663,324
FLEXIBLE TUBING STRUCTURE AND METHOD OF MANUFACTURE
Filed Nov. 21, 1946   2 Sheets-Sheet 2
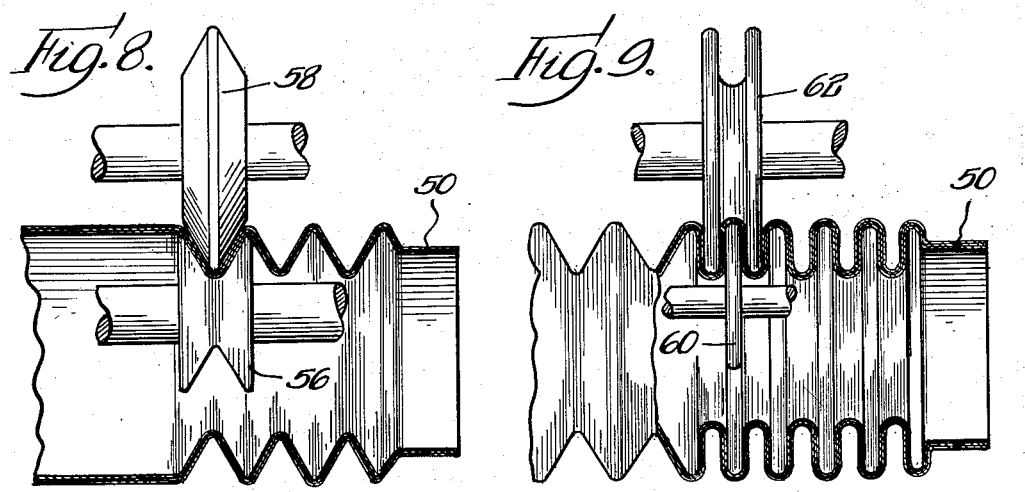
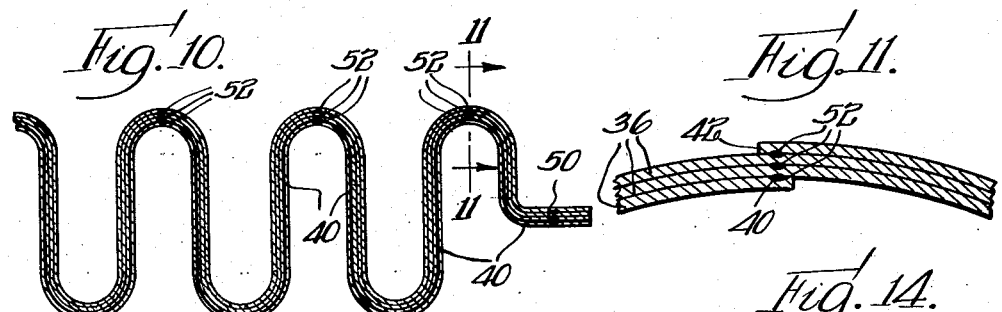
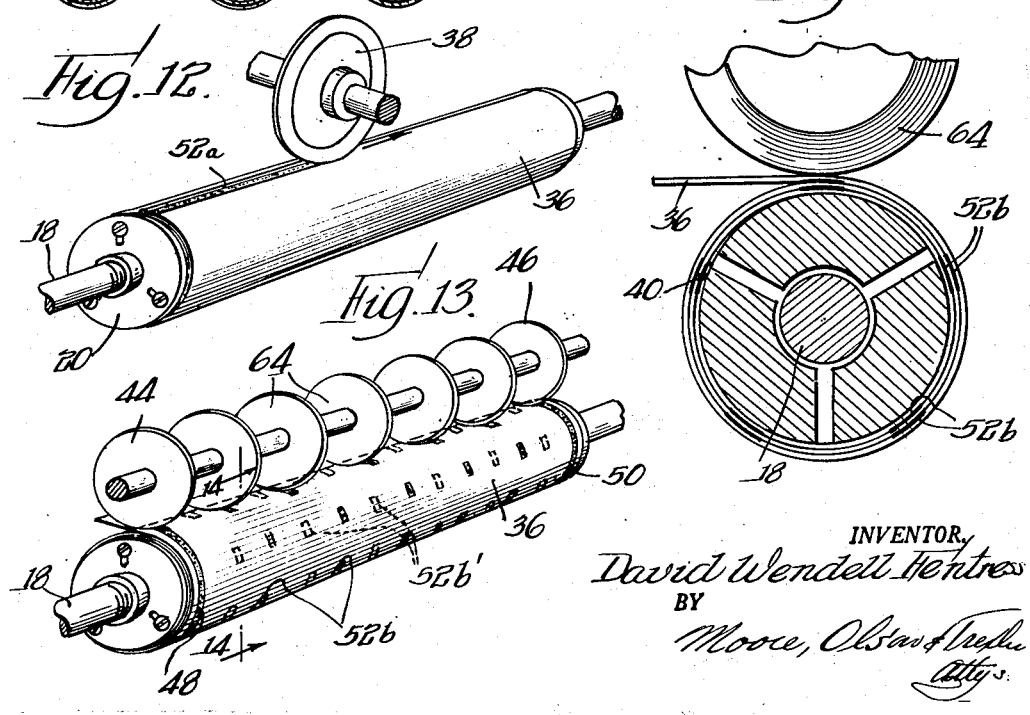
INVENTOR,
David Wendell Fentress
BY
Moore, Olson & Trexler
Attys.

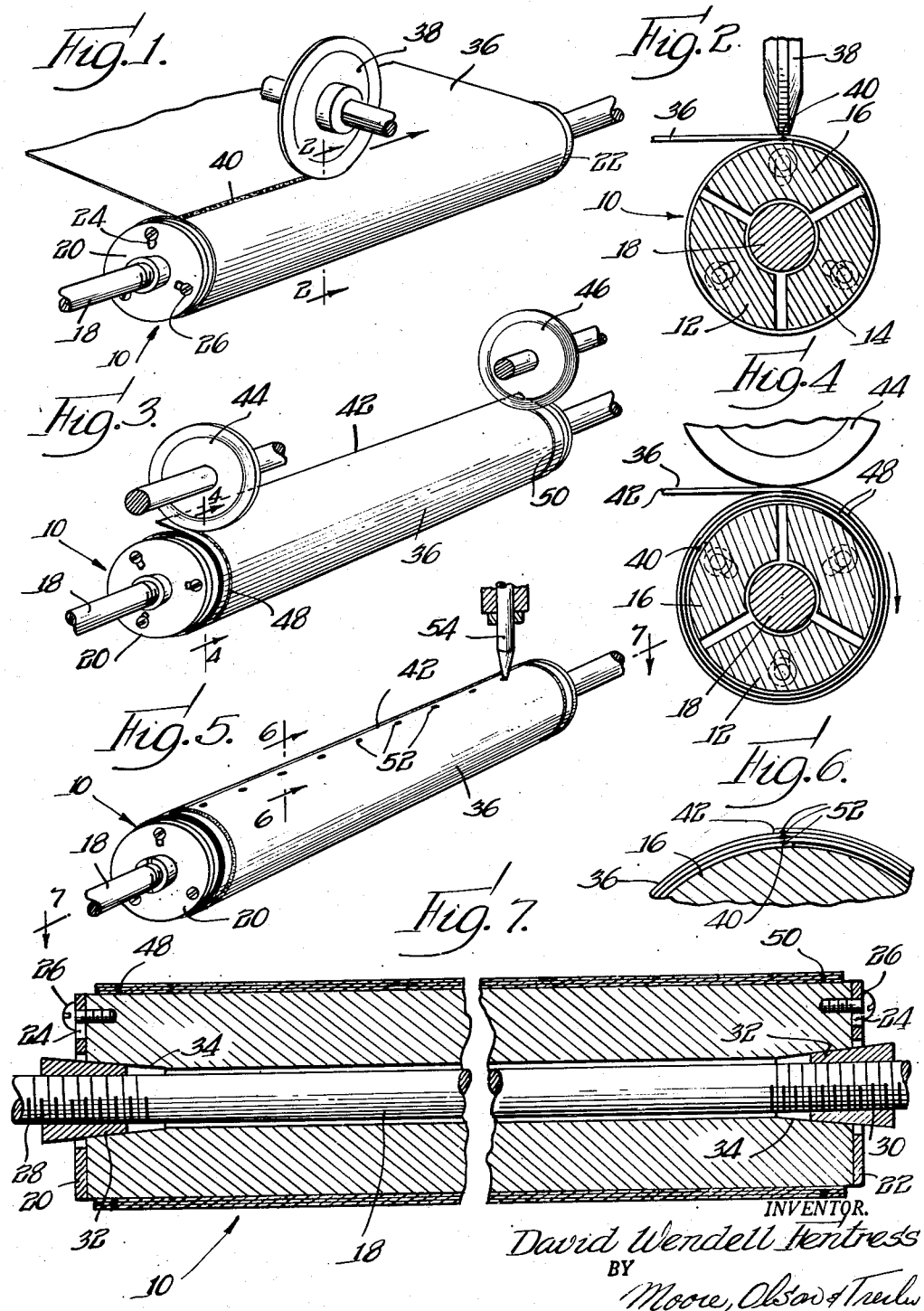

Patented Dec. 22, 1953

2,663,324

UNITED STATES PATENT OFFICE 2,663,324

FLEXIBLE TUBING STRUCTURE AND METHOD OF MANUFACTURE

David Wendell Fentress, Barrington, Ill., assignor to Chicago Metal Hose Corporation, Maywood, Ill., a corporation of Illinois Application November 21, 1946, Serial No. 711,351

6 Claims. (Cl. 138—50)

This invention relates to tubing structures, and to means and methods for effecting the fabrication thereof, and concerns particularly tubing of the flexible or corrugated type.

It is an object of the invention to provide a flexible or corrugated tubing structure of improved construction and improved operating characteristics, and to provide improved and readily operable means and methods for effecting the tubing fabrication.

More specifically stated, it is an object of the invention to provide an improved corrugated tubing of spiral laminated construction, having a high degree of flexibility in relation to its strength and resistance to fluid bursting pressures.

Further objects of the invention are to provide an improved corrugated tubing structure of the foregoing type, which will have requisite fluid tightness; and which is so reinforced that it will be durable in service, and may be corrugated or convoluted without undue distortion of the wall surfaces, while still retaining a high degree of flexibility.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a perspective view, somewhat diagrammatic in form, illustrating means and methods for effecting the initial fabricating step in the construction of tubing in accordance with the present invention, and in accordance with one preferred embodiment thereof;

Fig. 2 is an enlarged transverse sectional view through the welding support arbor and associated parts, as illustrated in Fig. 1, and taken as indicated by the line 2—2 thereof;

Fig. 3 is a view similar to Fig. 1, but illustrating a further step in the fabrication of the tubing;

Fig. 4 is an enlarged transverse sectional view through the arbor and associated parts, taken as indicated by the line 4—4 of Fig. 3;

Fig. 5 is a view, similar to Figs. 1 and 3, but illustrating a still further step in the fabrication of the tubing;

Fig. 6 is an enlarged partial section through the structure of Fig. 5, taken as indicated by the line 6—6 thereof;

Fig. 7 is a longitudinal sectional view through the welding arbor, showing the tubing in the condition of Fig. 5, and taken as indicated by the line 7—7 thereof;

Figs. 8 and 9 are views illustrating successive steps in effecting the corrugation of the tubing, in accordance with the embodiment selected for illustration;

Fig. 10 is an enlarged longitudinal sectional view through the tubing wall, illustrating the manner of welding and securing the several wall thicknesses;

Fig. 11 is a transverse sectional view through the tubing wall on a further enlarged scale, and taken as indicated by the line 11—11 of Fig. 10;

Fig. 12 is a view similar to Figs. 1, 3 and 5, but illustrating a modified embodiment;

Fig. 13 is a view, also similar to Figs. 1, 3 and 5, but illustrating a still further modified embodiment or structure; and Fig. 14 is an enlarged transverse sectional view through the welding arbor and associated parts showing the structure of Fig. 13, and taken as indicated by the line 14—14 thereof.

In certain instances tubing structures are required having a high degree of flexibility in respect to their strength and resistance to bursting pressures. In such instances the use of tubing having a laminated wall structure is indicated; the laminated wall having a strength or resistance to bursting pressures which is roughly proportional to the over-all thickness of the composite wall, whereas the rigidity or resistance to flexibility of the tubing is likewise only a first power multiple of the rigidity of each lamination. If the tubing is constructed of a single wall of increased thickness, the rigidity varies, roughly, as the cube of the wall thickness so that in the case of tubing having a relatively thick wall a structure deficient in the necessary flexibility may result.

While the use of laminated tubing is thus desirable in many instances, difficulty has been encountered in the production of satisfactory flexible laminated tubing, particularly in connection with the fabrication and corrugation thereof. In accordance with the present invention satisfactory and readily operable means and methods are provided for fabricating the laminated tube wall, and for effecting the reinforcement and securing thereof without unduly impairing flexibility, and in such manner that the tubing may be satisfactorily corrugated with such type of convolution as may be desired, without distortion or rupture of the tube wall surfaces.

Referring more specifically to the drawings, and first to the embodiment illustrated in Figs.

1–11, in Fig. 1 there is illustrated a support and welding mandrel 10, the detailed construction of which is best shown in Figs. 2 and 7. As shown, the mandrel or arbor is composed of three expansible sections 12, 14 and 16 mounted upon a central shaft 18 which may be supported and rotatably driven in any desired manner by means not shown. A pair of end plates 20 and 22 is provided at the ends of the mandrel, these end plates being provided with radial slots 24 adapted to receive screws 26 carried by the several mandrel sections. The screws are sufficiently loose so that radial shifting of the mandrel sections in respect to the end plates is thus permitted, the outward movement of the sections being limited by the engagement of the screw shanks against the ends of the plate slots.

The shaft 18 is provided with right- and left-hand threaded portions 28 and 30, which portions are cooperable with a pair of threaded cone members 32 adapted to slide against conical surfaces 34 suitably formed in the opposite ends of the bores of the mandrel sections.

It will be seen that upon relative rotation of shaft 18 in respect to the mandrel, the several sections thereof will be radially expanded to a predetermined size determined by the length of the slots 24, or permitted to collapse to a smaller size to facilitate the removal of a completed cylinder work piece from the mandrel. Normally and during the operations presently to be described, the shaft 18 and the several mandrel sections move as a unit, if and as the mandrel is rotated.

Referring further to Figs. 1 and 2, in fabricating the tubing a sheet 36 is first drawn from a suitable supply source onto and around the expanded mandrel 10 by the rotation thereof. The sheet 36 is formed of suitable material, such as metal, of which the tubing is to be fabricated, and has a length transversely of the mandrel axis determined by the diameter of the tubing to be formed and the number of laminations desired, and a length axially of the mandrel determined by the length of the tubing desired. The length of the mandrel 10 is likewise determined by the length of the tubing to be formed, and the expanded diameter thereof determines the normal or mean diameter of the tubing prior to the corrugating operations. Tubing structures of various lengths may be fabricated in accordance with the invention to provide either relatively long conduits or relatively short bellows, as may be desired; and it is to be understood that the term "tubing" as herein used denotes any desired length including relatively short structures sometimes referred to as bellows.

After slightly in excess of one complete convolution of the metal sheet has been drawn onto the mandrel, as shown in Fig. 2, a welding roller 38 is engaged against the overlapped seam, the welding roller having been previously withdrawn from the mandrel during the initial winding operation of the metal sheet, as will be understood. As the welding roller is shifted longitudinally of the mandrel, as indicated by the arrow in Fig. 1, and welding current applied, a longitudinal seam weld will be provided extending lengthwise of the tubing, as indicated by the reference number 40. Suitable means may be provided for mounting the welding roller, and for shifting the roller longitudinally of the mandrel, or for shifting the mandrel longitudinally in respect to the roller, and for applying the welding current to the roller and to the mandrel, in accordance with standard welding practice.

After the longitudinal weld 40 has been formed, the welding roller 38 is withdrawn and rotation of the mandrel structure resumed so as to further wind the sheet 36 upon the mandrel into several superimposed spiral laminations, as many as desired. The length of the sheet 36 is such that the end 42 thereof will slightly overlap the welded seam 40 in the finished tubing (see Fig. 11). During the final revolution of the mandrel, a pair of welding rollers 44 and 46 is engaged against the sheet at the opposite ends of the mandrel and welding current applied so as to form circular seam-resistance welds 48 and 50 between the sheets at the opposite ends of the tubing. The rollers 44 and 46 may be continuously engaged against the sheet both during the initial winding as shown in Fig. 1, and during the subsequent winding, if desired, and if the rollers are power driven they will aid in winding the sheet upon the mandrel. For economy it is desirable that the welding current only be applied during the final revolution of the mandrel to form one complete circular seam-resistance weld at each tubing end.

To further seal the tubing sheet and retain it in position during the subsequent corrugating operations the trailing sheet edge 42 may next be spot welded into position as indicated at 52 in Figs. 5 and 6. This spot welding may conveniently be effected by means of a welding electrode 54 engaged sequentially along the length of the mandrel at spaced intervals, and the welding of current applied. The spot welds 52 are preferably spaced apart a distance corresponding to the pitch of the tubing corrugations to be formed, so that each spot weld will be at a predetermined position in the convolution, as will subsequently appear. After the welding operations the tubing may be removed from the welding and support mandrel, by effecting the collapse thereof as previously described.

The corrugations, either helical or annular, may be formed in any desired manner. As illustrated in Figs. 8 and 9 the corrugations in the particular embodiment shown are annularly formed by a plurality of sequential rolling operations between suitably formed shaping rollers. As shown, the tubing is first subjected at spaced intervals to the action of a pair of complementary forming rollers 56 and 58 disposed internally and externally of the tubing whereby to form sequentially a plurality of annular corrugations or convolutions in the tubing. To effect the further shaping of the convolutions into the desired form, they may be subjected to the action of further forming rollers 60 and 62, as shown in Fig. 9, whereby to form the convolutions into the desired final shape. As previously indicated, the means for forming the convolutions may take various specific forms, for example as shown in Dreyer Patent 1,879,663 dated September 27, 1932, or as shown in Fentress Patent 2,306,018 dated December 22, 1942.

The details of the completed tubing wall are illustrated in Figs. 10 and 11. It will be seen that a corrugated tubing wall having a plurality of spiral laminations is provided, the corrugations being annular and a triple ply wall structure being formed in the particular embodiment illustrated. The longitudinal seam weld 40 extends lengthwise of the entire tubing and forms a fluid seal extending lengthwise of the entire tube so that the spiral wall structure is positively sealed against fluid leakage. However, it will be seen that this weld is formed only between the two innermost wall thicknesses or laminations whereby the weld imparts only a minimum of rigidity to the structure. The remaining laminations except for the innermost two are free to slide relative to each other during the formation of convolutions, thus eliminating built up stress and resistance to formation which would result in a similar thickness composed of one piece. Also, the laminations are free to slide relative to each other during the flexing of the tube in service, permitting a high factor of flexibility and fatigue life.

The spot welds 52 extend through all laminations, but these are selectively positioned at the crests of the convolutions where flexing is a minimum during use of the tubing, so that these welds likewise reduce the flexibility of the tubing only a minimum amount.

The circular seam resistance welds 48 and 50 likewise pass through all laminations and provide a secure holding means for anchoring the tubing walls together at the tubing ends. These welds are beyond the zone of flexing and hence do not interfere with the shifting of the tube walls during the flexing movements.

The several welds, as heretofore discussed, provide a sufficient and firm anchorage for the tubing walls so that no misalignment or unwanted distortion thereof takes place during corrugating operations, regardless of the specific type of corrugating means which may be employed. By this means a tubing structure is produced of maximum strength, maximum flexibility, and with accurately formed corrugations or convolutions, to provide a resulting finished product of maximum efficiency which will maintain itself in alignment and flex freely in use.

In certain instances, wherein the very highest degree of flexibility is not required, it may be desirable to provide additional anchorage for the tubing laminations prior to the corrugating operations. In such instances, as shown in Fig. 12, the spot welds 52 may be replaced by a second longitudinal seam resistance weld as indicated at 52a. This weld may be formed by causing the welding roller 38 to be projected longitudinally of the tubing a second time, after the final winding of the strip, so as to replace the spot welding 52 by a longitudinal seam weld 52a. In other words, as indicated in Fig. 12, a longitudinal seam-resistance weld is first applied between the innermost laminations of the tube, as in Fig. 1, and a second longitudinal resistance weld 52a superimposed thereon after the final winding operations.

In Figs. 13 and 14 a still further modified embodiment is illustrated. In this instance after the longitudinal seam weld 40 has been formed, as previously described in reference to Fig. 1, and as the final convolutions are being wound upon the mandrel, a plurality of welding rollers 64 is engaged with the sheet along with the welding rollers 44 and 46 and welding current applied to form welds as indicated at 52b simultaneously with the formation of the circular seam-resistance welds 48 and 50. The welds 52b may be complete circular seam-resistance welds, or spaced spot welds as indicated in Figs. 13 and 14, or only a single spot weld, if desired, depending upon the time of application of the welding current. The welding rollers 64 are so positioned that the welds 52b are formed at those portions of the tubing which will form the tubing crests after the corrugating operations. One welding roller 64 may be provided for each tubing crest, or only for spaced tubing crests, as indicated in Fig. 13. By shifting the rollers 64 additional tubing crests may be welded as indicated by the dotted welds 52b', after the formation of the welds 52b.

It is obvious that various changes may be made in the specific embodiments set forth, and in the method steps stated, without departing from the spirit of the invention. The invention is accordingly not to be limited to the specific structures and methods shown and described, but only as indicated in the following claims.

The invention is hereby claimed as follows:

1. The method of making a flexible tubing structure which comprises wrapping a sheet upon itself to provide a plurality of superposed spiral laminations, welding innermost laminations to each other by weld means extending continuously longitudinally of the tubing, welding outer laminations at predetermined points spaced longitudinally of the tubing structure, circumferentially welding the ends of the tubing structure, and corrugating said sheet along a predetermined portion of its length to provide a corrugated spirally laminated tubing wall with the outer surfaces of the crests of the corrugations including the longitudinally spaced welds.

2. A flexible tubing structure comprising a plurality of superposed laminations corrugated along predetermined portions of the lengths thereof, a weld extending longitudinally of innermost laminations to provide a fluid seal and being relatively narrow whereby to minimize resistance to flexing of the tubing, and additional welds of limited extent spaced longitudinally of the tubing for joining remaining laminations without substantial increase in resistance to flexing thereof.

3. A flexible tubing structure as claimed in claim 2, wherein the additional welds are spaced longitudinally and circumferentially of the tubing.

4. A flexible tubing structure as claimed in claim 2, wherein the additional welds are disposed at the apices of the corrugations.

5. A flexible tubing structure as claimed in claim 2, wherein the additional welds are spot welds spaced longitudinally of the tubing at the centers of the crest portions of the corrugations and wherein the laminations are welded at the ends thereof by circumferential end welds.

6. A flexible tubing structure as claimed in claim 2, wherein the superposed laminations are welded together adjacent at least one end of the tubing structure by weld means extending circumferentially thereof.

DAVID WENDELL FENTRESS.

References Cited in the file of this patent
UNITED STATES PATENTS

| Number | Name | Date |
|---|---|---|
| 35,124 | Yeakel | Apr. 29, 1862 |
| 967,260 | Witzenmann et al. | Aug. 16, 1910 |
| 979,460 | Fulton | Dec. 27, 1910 |
| 1,492,954 | Biggert, Jr. | May 6, 1924 |
| 1,645,239 | Hume | Oct. 11, 1927 |
| 2,015,173 | Andrus | Sept. 24, 1935 |
| 2,313,306 | Wiegand | Mar. 9, 1943 |
| 2,331,504 | Raymond et al. | Oct. 12, 1943 |
| 2,365,181 | Fentress | Dec. 19, 1944 |